US011853695B2

United States Patent
Anslow

(10) Patent No.: US 11,853,695 B2
(45) Date of Patent: Dec. 26, 2023

(54) APPARATUS AND METHOD FOR INSERTING SUBSTITUTE WORDS BASED ON TARGET CHARACTERISTICS

(71) Applicant: Sony Corporation, Tokyo (JP)

(72) Inventor: Michael Anslow, Paris (FR)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 17/146,501

(22) Filed: Jan. 12, 2021

(65) Prior Publication Data

US 2021/0216709 A1    Jul. 15, 2021

(30) Foreign Application Priority Data

Jan. 13, 2020    (EP) .................................. 20151444

(51) Int. Cl.
*G06F 40/274*    (2020.01)
*G10L 15/08*    (2006.01)
(Continued)

(52) U.S. Cl.
CPC ............ *G06F 40/274* (2020.01); *G06F 40/30* (2020.01); *G10L 15/08* (2013.01); *G10L 25/63* (2013.01)

(58) Field of Classification Search
CPC ...... G06F 40/00; G06F 40/117; G06F 40/166; G06F 40/20; G06F 40/205; G06F 40/211;
(Continued)

(56) References Cited

U.S. PATENT DOCUMENTS 5,873,660 A     2/1999  Walsh et al.
7,810,033 B2 * 10/2010  Cordes .................. G06F 40/103
                                                                    715/706
(Continued)

FOREIGN PATENT DOCUMENTS

WO    WO-2021025825 A1 *  2/2021

OTHER PUBLICATIONS

Jurafsky et al., "Speech and Language Processing", An Introduction to Natural Language Processing, Computational Linguistics, and Speech Recognition, Oct. 16, 2019, pp. 1-613.
(Continued)

*Primary Examiner* — Paras D Shah
*Assistant Examiner* — Alexander Joongie Kim
(74) *Attorney, Agent, or Firm* — XSENSUS LLP

(57) ABSTRACT

Data processing apparatus comprises a data memory; a selection controller comprising a computer processor; and a digital interface between a control process implemented by the selection controller and a text handling process implemented by the computer processor or another processor; in which: the selection controller is configured to provide a text document from the data memory to the text handling process to identify one or more characteristics of words in the text document; the selection controller is configured to provide user selection of one or more of the words in the text document to be substituted and of one or more target characteristics; and the selection controller is configured to request from the text handling process a set of one or more substitute words for the selected words such that the substitute words comply with the selected one or more of the target characteristics.

13 Claims, 7 Drawing Sheets

(51) Int. Cl.
*G06F 40/30* (2020.01)
*G10L 25/63* (2013.01)

(58) Field of Classification Search
CPC .... G06F 40/237; G06F 40/247; G06F 40/253;
G06F 40/263; G06F 40/274; G06F
40/279; G06F 40/30; G06F 16/3344;
G10L 15/00; G10L 15/08; G10L 25/63
See application file for complete search history.

(56) References Cited

U.S. PATENT DOCUMENTS

| | | | | |
|---|---|---|---|---|
| 10,599,767 | B1* | 3/2020 | Mattera | G06F 40/268 |
| 2009/0313274 | A1* | 12/2009 | Chen | H04L 67/306 |
| 2010/0100568 | A1* | 4/2010 | Papin | G06F 3/0237 |
| | | | | 707/794 |
| 2012/0016678 | A1* | 1/2012 | Gruber | H04M 1/6091 |
| | | | | 704/E21.001 |
| 2016/0062969 | A1 | 3/2016 | Mengle et al. | |
| 2016/0063874 | A1* | 3/2016 | Czerwinski | G16H 50/20 |
| | | | | 434/236 |
| 2017/0004208 | A1 | 1/2017 | Podder et al. | |
| 2017/0286399 | A1 | 10/2017 | Popescu et al. | |
| 2018/0032499 | A1* | 2/2018 | Hampson | G06F 40/232 |
| 2018/0260385 | A1* | 9/2018 | Fan | G06F 40/30 |
| 2020/0320113 | A1* | 10/2020 | Zhu | G06F 16/31 |

OTHER PUBLICATIONS

Devlin et al., "BERT: Pre-training of Deep Bidirectional Transformers for Language Understanding", May 24, 2019, 16 pages.
Devlin et al., "Open Sourcing BERT: State of-the-Art Pre-training for Natural Language Processing", pp. 1-4. Nov. 2, 2018.
"Models", Models —spaCy Models Documentation, pp. 1-7. Dec. 19, 2019.
Wikipedia, "Natural language processing", 9 pages. Dec. 12, 2019.

* cited by examiner

APPARATUS AND METHOD FOR INSERTING SUBSTITUTE WORDS BASED ON TARGET CHARACTERISTICS

CROSS-REFERENCE TO RELATED APPLICATION

This application claims the benefit of European Patent Application No. EP 20151444.5 filed on Jan. 13, 2020, the entire disclosures of which are incorporated herein by reference.

BACKGROUND

Field

This disclosure relates to apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor implicitly admitted as prior art against the present disclosure.

Computer-assisted document and text handling arrangements have been proposed, in which words in a sentence, phrase or other text portion are parsed for characteristics such as respective parts of speech.

SUMMARY

This disclosure provides data processing apparatus comprising:
a data memory;
a selection controller comprising a computer processor; and
a digital interface between a control process implemented by the selection controller and a text handling process implemented by the computer processor or another processor;
in which:
the selection controller is configured to provide a text document from the data memory to the text handling process to identify one or more characteristics of words in the text document;
the selection controller is configured to provide user selection of one or more of the words in the text document to be substituted and of one or more target characteristics; and the selection controller is configured to request from the text handling process a set of one or more substitute words for the selected words such that the substitute words comply with the selected one or more target characteristics This disclosure also provides a computer-implemented method comprising:
providing a text document from a data memory to a text handling process to identify one or more characteristics of words in the text document;
providing user selection of one or more of the words in the text document to be substituted and one or more target characteristics; and
requesting from the text handling process a set of one or more substitute words for the selected words such that the substitute words comply with the selected one or more target characteristics.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
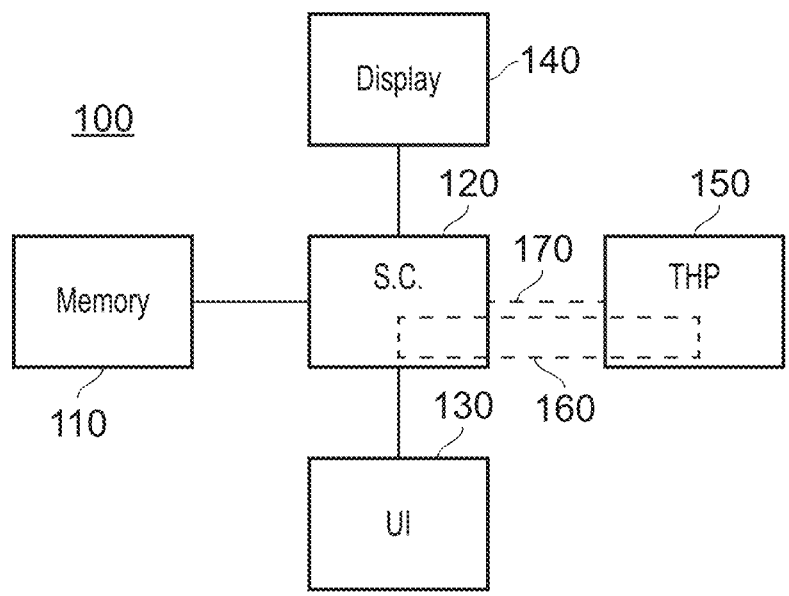
FIG. 1 schematically illustrates an apparatus.

Example arrangements using the present techniques will be described with reference to the accompanying drawings.
Overview of Apparatus FIG. 1 schematically illustrates a data processing apparatus 100 comprising a data memory 110, a selection controller 120, a user interface (UI) 130 such as, for example, a keyboard and/or a mouse or trackpad control, and a display 140.

A text handling process 150 is illustrated. This may be implemented by a common computer processor 160 which also implements the selection controller 120, or another computer processor. For this reason, the computer processor 160 is shown schematically as a broken-line box overlapping the selection controller 120 and the text handling process 150. For example, the selection controller and the text handling process could be implemented as separate tasks, threads, operating system partitions or the like by the computer processor 160.

Alternatively, the text handling process 150 could be implemented by an external server. An example of data processing apparatus which could provide the functionality of such an external server is provided in FIG. 9 and described below.

Whether the selection controller and the text handling process are implemented by the common computer processor 160, by separate computer processors or by a client-server arrangement, a digital interface 170 is provided between a control process implemented by the selection controller and the text handling process 150. In the case that these processors are implemented by a common computer processor, the digital interface 170 relates to communication between tasks, threads or the like running on the common computer processor. In the example case that the various processors are implemented by separate respective but interconnected computer processors, the digital interface 170 relates to a bus or similar interface between such computer processors. In the example arrangement in which, for example, the selection controller is implemented at a client device and the text handling process is implemented at an external server (which is to say, external to an apparatus implementing one or more of the other components including the selection controller 120), the digital interface may relate, for example, to a network or internet connection.

The data memory may be (at least in part) a machine-readable non-volatile storage medium to store software by which the selection controller and/or text handling process execute. It can also serve to store a text document for handling using the techniques described here. It may be implemented as two or more partitioned memories or devices. A text document may initially be loaded into the data memory 110 from a networked or other store (not shown), for example under the control of the selection controller 120 in response to user commands at the UI 130. In other examples, the user may type or create a text document, for example by typing words at the UI 130 (and for example running a word processor or similar program, not shown).

By way of summary of the operations to be described below, the selection controller 120 is configured to provide some or all of a text document from the data memory 110 to the text handling process 150. The provision or passing of such a document to the text handling process allows the document (or a part of it) to be handled or parsed by the text handling process so that the text handling process may use techniques to be described below to identify one or more characteristics of words in the text document. For example, such characteristics may be parts of speech (noun, verb, adjective, adverb . . . ) and/or emotion tags (aggressive, calm, loving . . . or the like) and/or a classification of a word as a weapon, noise, vehicle, city, food, flavour, emotion or the like.

Although references made to a text document and to parts of a text document, it will be appreciated that any section of one or more words can be considered as a text document, even if that text document is itself a sub-portion of a larger text document.

The selection controller receives the identified characteristic(s), for example as characteristic data, from the text handling process and, in at least some examples, provides a representation on the display 140 in a form to be described below with reference to FIG. 6. Using that display, the selection controller is configured to provide user selection of one or more words in the text document to be substituted (in that the selection controller 120 may receive commands from the UI 130 and format them into user selection data to be provided to the text handling process 150) and using these techniques to allow user selection of (for example) one or more of the identified characteristics to be retained or other characteristic as one or more target characteristics for a candidate replacement or inserted word at that location in the text. Selectable target characteristics may also be selectable from a corresponding list of options. That is to say, a particular word or word location may have one or more target characteristics associated with it (whether selected from the identified characteristics or from a menu of other target characteristics), for example by user control or commands provided by the UI 130 to the selection controller 120, and the one or more target characteristics may optionally be selected from the identified characteristics of an original or previous word at that location. Alternatively, the selection controller can automatically adopt, as target characteristics, any or all of the identified characteristics associated with a word location of a user-selected word (so that from the users point of view, a single act of selection of a word location also serves to select any and all of its identified characteristics as target characteristics). In other words the selection controller may be configured to provide user selection of one or more of the words in the text document to be substituted and of one or more target characteristics; and configured to request from the text handling process a set of one or more substitute words for the selected words such that the substitute words comply with the selected one or more target characteristics. For example the target characteristics may comprise one or more of the identified characteristics and in such a case the selection controller is configured to provide user selection of one or more of the identified characteristics to be retained as target characteristics.

These arrangements will be described below in further detail.

Once the user has selected words to be substituted and/or one or more identified characteristics to be retained and/or one or more other target characteristics, the selection controller is configured to request from the text handling process a set of one or more substitute words for the selected words such that the substitute words comply with the selected one or more of the identified characteristics to be retained and/or other selected target characteristics.

Figure 2:
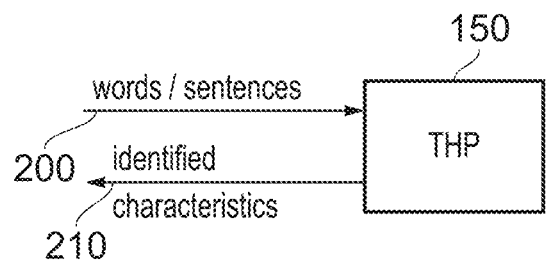
FIGS. 2 and 3 schematically illustrate interactions with a text handling process.
Figure 3:
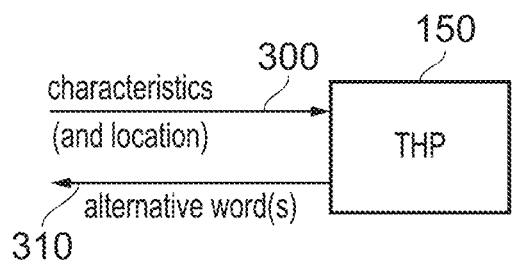

FIGS. 2 and 3 schematically illustrate example interactions between the selection controller 120 and the text handling process 150.

In FIG. 2, the selection controller 120 provides 200 words and/or sentences to the text handling process for characteristic identification, and the text handling process responds 210 with the identified characteristics.

In FIG. 3, the selection controller generates a query 300 to the text handling process (for example, the external server as discussed above) detailing word characteristics (for example, to be retained and/or other targets) and/or locations in the text in order that the text handling process may respond with potential substitute words 310. In other words, the query defines at least a word to be substituted.

Techniques to implement the text handling process may include so-called Bidirectional Encoder Representations from Transformers ("BERT") and/or the tokenisation/classification techniques described at spacy.io. References to each of these and to other suitable techniques are contained in the following documents:

BERT: Pre-training of Deep Bidirectional Transformers for Language Understanding, Devlin et al, arxiv.org/abs/1810.04805 spacy.io/models

Open Sourcing BERT: State-of-the-art Pre-training for Natural Language Processing, Devlin et al, ai.googleblog.com/2018/11/open-sourcing-bert-state-of-art-pre.html en.wikipedia.org/wiki/Natural_language_processing "Speech and Language Processing An Introduction to Natural Language Processing, Computational Linguistics, and Speech Recognition Third Edition draft", available online at the priority date of the present application at: web.stanford.edu/~jurafsky/slp3/ed3book.pdf The text handling process 150 operates according to one or more of these techniques so as to fulfil the functionality discussed here. These documents are incorporated in their entirety in this description, by reference.

Operating Methods

Figure 4:
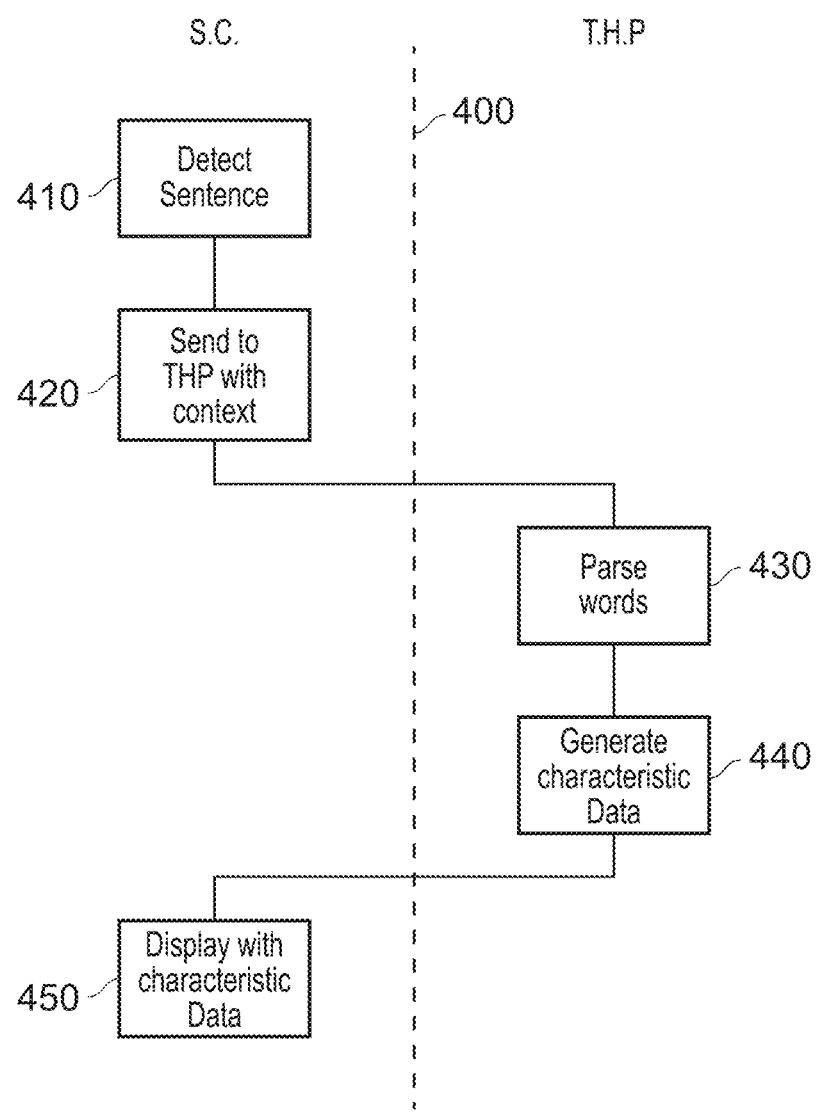
FIGS. 4 and 5 are schematic flowcharts illustrating respective methods.

FIG. 4 is a schematic flowchart illustrating a method. In common with FIG. 5 and FIG. 8, a vertical broken line is drawn such that operations to the left of the vertical line 400 represent operations of the selection controller and operations to the right of the vertical line 400 represent operations of the text handling process. Clearly, if both of these processes are handled by a common computer processor, the distinction between the various actions does not need to be as stark as is represented in the flowcharts and actions can be implemented by different processes and/or shared between processes as appropriate.

Referring to FIG. 4, at a step 410, the selection controller detects a sentence of interest, for example in response to a user command. At a step 420, the selection controller sends at least the selected sentence or other group of words to the text handling process, potentially or optionally with contextual information such as surrounding sentences or words.

At a step 430 the text handling process detects the characteristics of each word in the sentence or phrase or other group of words which it has received from the selection controller and generates characteristic data at a step 440 defining those identified characteristics to return to the selection controller. Note that the characteristic data may include null indications for any words which the text handling process was not able to identify or characterise. At a step 450 the selection controller generates for display a representation of the document along with a representation of the associated characteristic data (for example, by displaying a word representation of an identified characteristic in a particular display position relative to the word to which it relates, such as displaying the representational word "noun" under an identified noun).

Figure 5:
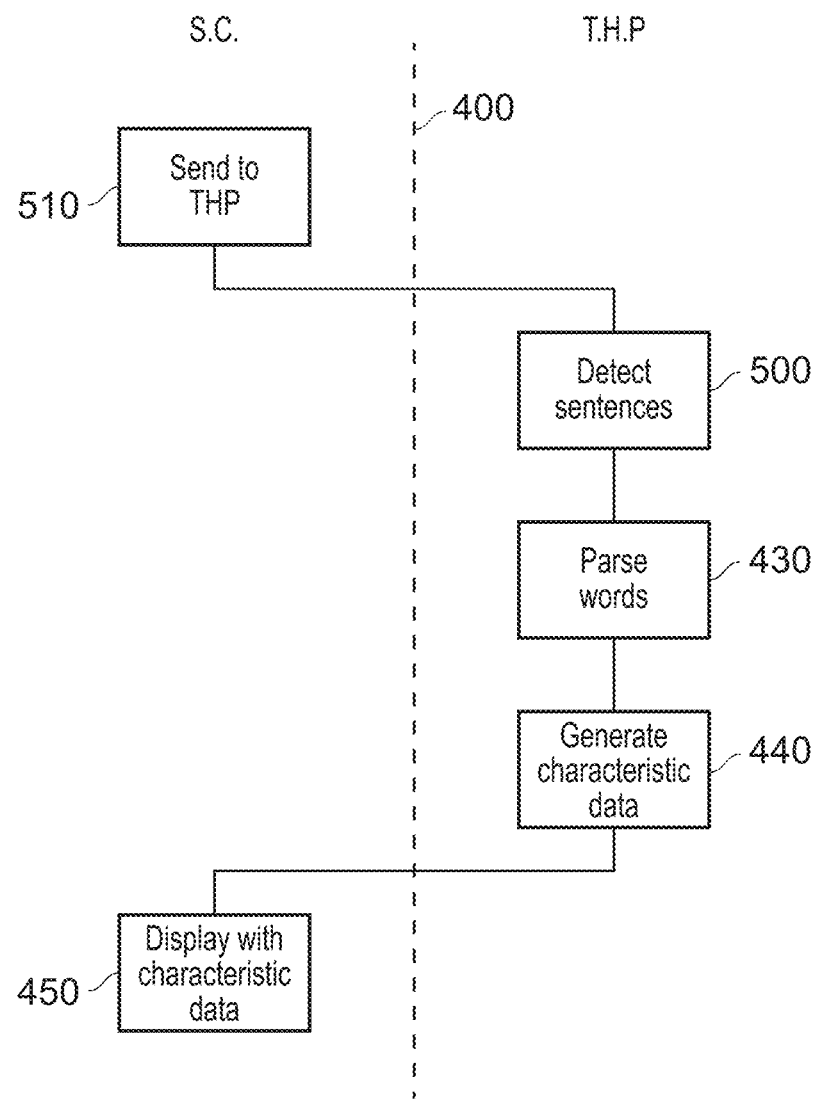

A similar arrangement is illustrated in FIG. 5 in which the steps 430, 440, 450 are identical of FIG. 4. A difference in FIG. 5 is that the partition of a text document into sentences, phrases or other groups of words is carried out at a step 500 at the text handling process, with a larger or potentially larger section of text having been sent at a step 510 by the selection controller in response to user command or otherwise.

Example User Interfaces

In example arrangements, the selection controller is configured to generate for display (for example by the display 140) a representation of the text document and any currently selected words and/or identified and/or target characteristics.

Figure 6:
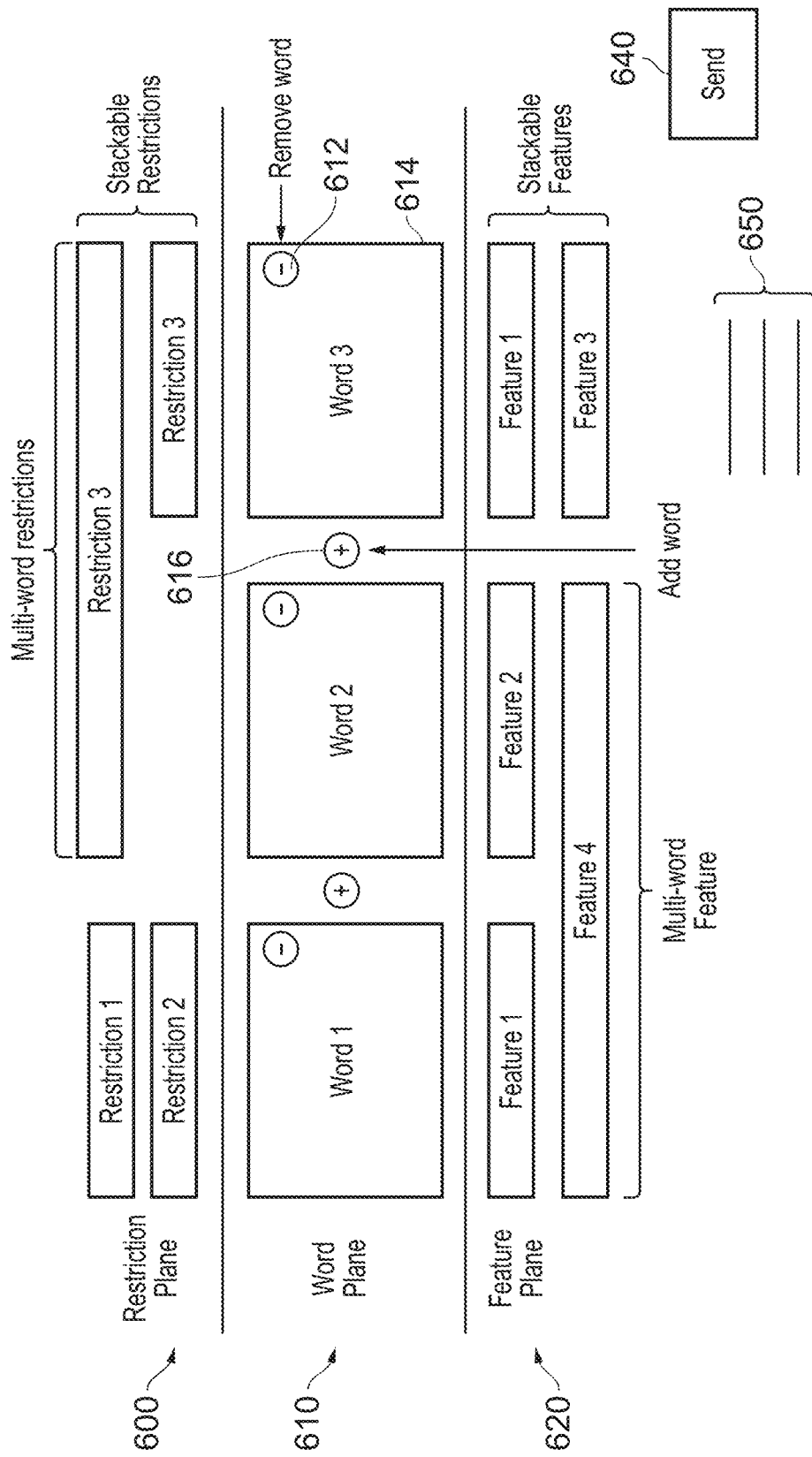
FIGS. 6 and 7 are schematic illustrations of a user interface display.

FIG. 6 is a schematic example of a screen display format (which may be provided to the display 140) generated by the selection controller in response to receipt of the information 210 of FIG. 2. The display is organised on a schematic basis as a set of "planes", namely a restriction plane 600, a word plane 610 and a feature (or characteristic) plane 620.

Turning first to the word plane, successive words in the current document or selected text are arranged in semantic order from left to right as displayed. The choice of words to be displayed can be set by the selection controller 120, for example as some or all of a set of words sent by the selection controller 120 to the text handling process for analysis or parsing, the selection being potentially in response to a user command received from the UI 130 by the selection controller 120.

The display of each word has a user control button 612 which allows that word to be deleted. If the user selects, for example, using a mouse click, on any portion of the rectangle 614 corresponding to a word other than the button 612, that word is selected and is, for example, greyed out as shown for "Word 3" in FIG. 6. If a word is removed in this way, a command may be sent by the selection controller 120 to the text handling process 150 for the text handling process to provide optional or candidate replacement words for surrounding locations so as to maintain at least grammatical sense and/or grammatical correctness of the remaining text in view of the deletion.

The word plane also includes user operable buttons 616 allowing a word to be inserted between other displayed words. This arrangement will be discussed further below.

In the feature plane, so-called features or characteristics of the words are displayed, for example in response to and/or as a representation of the characteristic data received from the text handling process 150. Note that the features are "stackable", which in this context signifies that more than one feature can apply to a word. For example, feature 1 and feature 3 both apply to word 3. Features can also be multi-word features such as feature 4 in FIG. 6 which applies to word 1 and to word 2. For example, a particular word could be a "noun" and also a "geopolitical entity". Similarly, a word could be an "adjective" as well as being "aggressive". The classification of words in this manner is carried out by the text handling process techniques discussed above.

The "stacking" feature may refer to for example, an arrangement in which the selection controller is configured to request from the text handling process a set of one or more substitute words at respective word locations; and the selection controller is configured to provide user selection of two or more target characteristics associated with a given word location. In other examples, "stacking" can relate to an arrangement in which the selection controller is configured to generate for display a representation of two or more target and/or identified characteristics associated with a given word.

The restriction plane will now be discussed.

In terms of the potential replacement or insertion of words, restrictions indicate criteria by which the newly inserted and newly replaced words must be found to comply. These so-called restrictions can refer here to the target characteristics or features discussed above with which a candidate word to be provided (for example as a replacement or an insertion) at a particular location is to comply. The restrictions may be user-selectable (by UI commands provided to the selection controller 120) and may be provided as target characteristic data (which may include the retention of a previous characteristic) associated with a word (or insertion) location to the text handling process 150 which then responds with one or more candidate words to be used (subject to user selection of such words by the UI/selection controller) at that word location. For example, if a particular word such as word 2 is currently detected to be an adjective, for example feature 2) and is selected for replacement, in the absence of any restrictions, the text handling process 150 could insert any word, whether adjective or not which makes grammatical sense (as determined by the algorithms of the text handling process). However, if a restriction is applied to word 2, such that word 2 has to be replaced by an adjective, then the text handling process 150 is constrained only to provide potential adjective replacements.

Adding Words

Returning to the concept of adding words, for example using the button 616, when the button is operated, a further word box similar to the box 614 is inserted at the position of the button 616 which was operated. At the time of insertion, the new word box has no characteristics (because a word does not yet exist there) and has no restrictions. One or more restrictions or target characteristics can then be added under user control, for example to specify that the newly inserted word must be an adverb or the like. This information is sent as part of the information 300 to the text handling process 150 to provide alternative words as in FIG. 3 discussed above.

Alternative words can be provided and displayed in response to the user selecting a word such as word 3 as in FIG. 6. Alternatively, the user can make one or more selections, potentially including restrictions/target characteristics, and then operate a further control such as a screen button 640 to initiate the interaction with the text handling process to provide alternate words. Once received the alternate words can be displayed, for example in a vertical line with the selected word as a representation 650 of suggestions of substitute words from which the user can select using the mouse control. Once selected, the alternative word may be substituted into the display at the word plane and the process may continue or terminate according to the user's requirements.

Therefore, in terms of adding words, the selection controller is configured to provide user specification of a further word to be inserted into the text document according to a selectable target characteristic of the further word and to generate a query to the text handling process indicating the selected target characteristic and a location, with respect to the text document, of the word to be inserted. Note that two or more further words can be selected for insertion at the same location by operating the button 616 multiple times, for example having an insertion order associated with them by the user selection.

Figure 7:
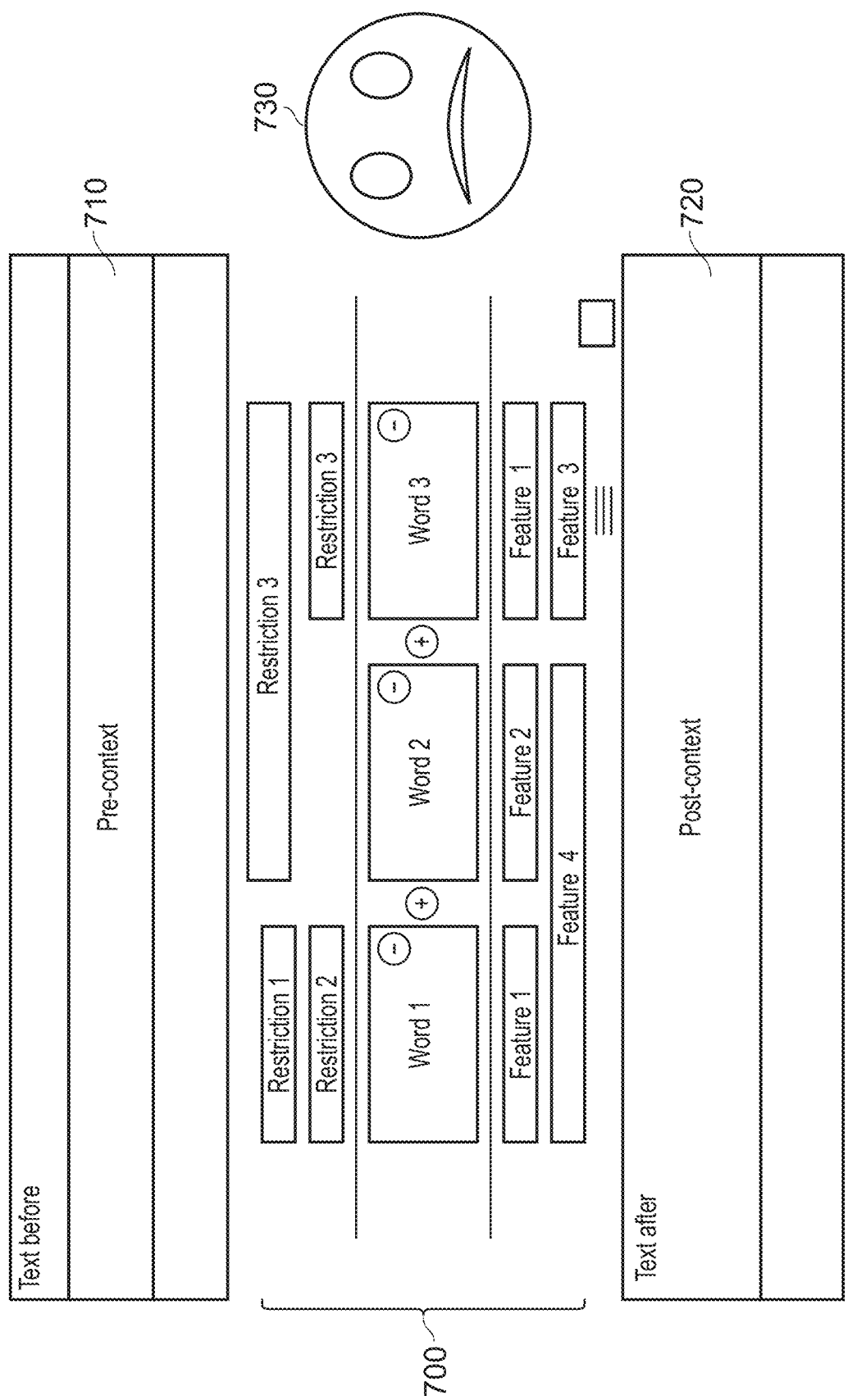

Further aspects of a user display are illustrated schematically in FIG. 7, in which a central portion 700 corresponds to the display of FIG. 6. In addition, text before and after the set of words in question can be displayed, and from within that text one or both of a pre-context 710 and a post-context 720 may be selected by the user to be provided as part of the information 300 to the text handling process 150 to assist in its selection of candidate new words.

Use of Images

In some example arrangements the selection controller is configured to provide user specification of the target characteristic of the further word to be inserted into the text document by associating an image with the location, in the text document, of the further word to be inserted into the text document; and the selection controller is configured to detect a target characteristic (or more than one) of the further word by detecting metadata associated with the image; and/or by providing the image to an image classification process implemented by the computer processor or another processor (which may be the same other processor or server that implements the text handling process). The user can choose a stored or network (for example internet) image to associate with a word location by operating controls of the UI 130 to cause an image selection process (which may include a download process) to be implemented by the selection controller 120. The selection controller can download metadata associated with the image (for example being associated with the source of the image) and/or can initiate the obtaining of characteristics by an image classification process running on the selection controller and/or an external server. The selection controller can limit the operation and/or results of such an image classification process so as to generate only characteristics from a list of characteristics held by the selection controller 120, being a list of characteristics which are useable by the text handling process 150.

An example of suitable techniques for obtaining characteristics by image analysis is provided in arxiv.org/abs/1907.02065, the contents of which are incorporated in this description by reference.

Another aspect illustrated schematically is the use of an image such as the schematic image 730 which can be applied as a restriction to one or more words, such that the image itself is classified (the example here would be "sad") and that classification used as a restriction for the intended meaning of the intended replacement word. Other example modes of operation are provided below.

Figure 8:
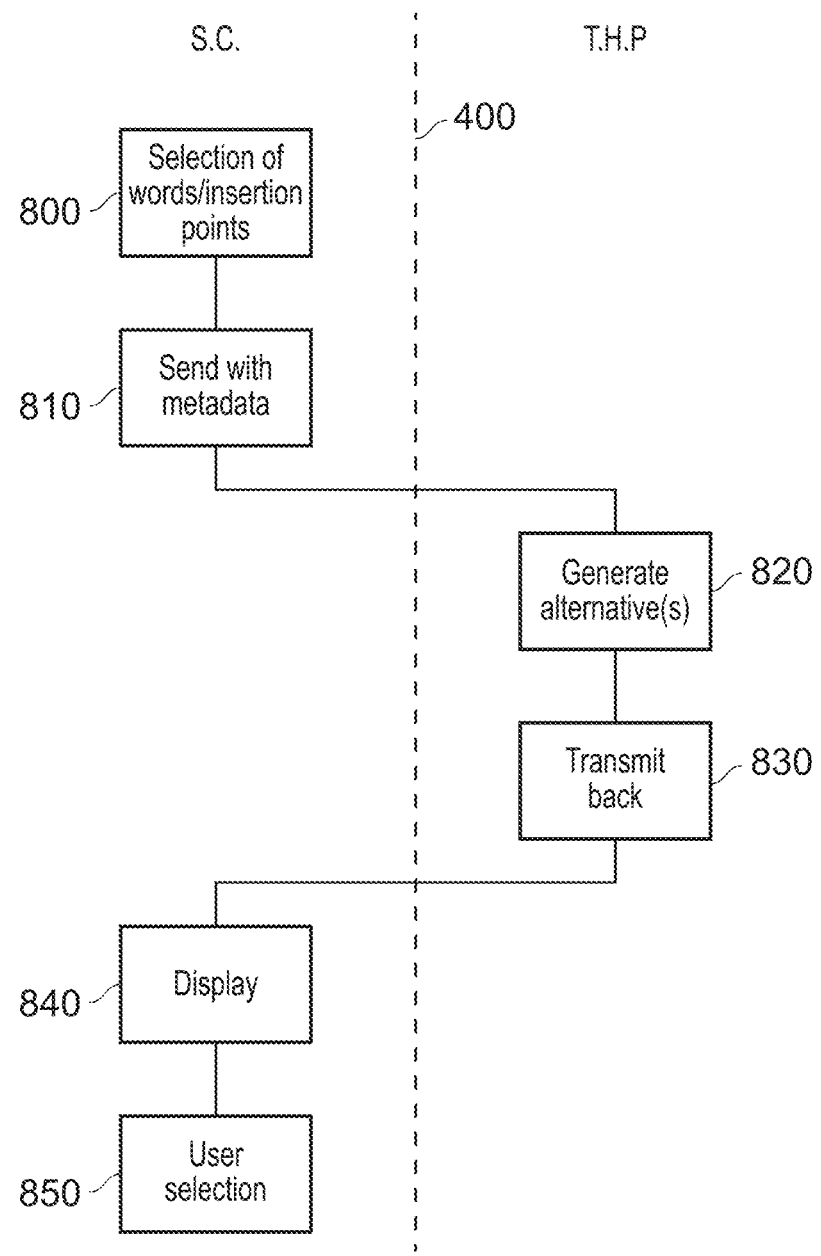
FIG. 8 is a schematic flowchart illustrating a method.

The process for providing candidate replacement words is illustrated schematically by the flowchart of FIG. 8, in which at a step 800, the selection controller provides the selection of words to be replace and/or insertion points for new words, and sends these at a step 810 with metadata which may include features/characteristics, restrictions, contextual data (FIG. 7) and the like.

The text handling process generates alternative or potential candidate insertion words at a step 800 and returns these 830 to the selection controller which generates for display (at a step 840) a representation 650 of the set of one or more substitute words to the user in order that the user can select from them at a step 850.

Figure 9:
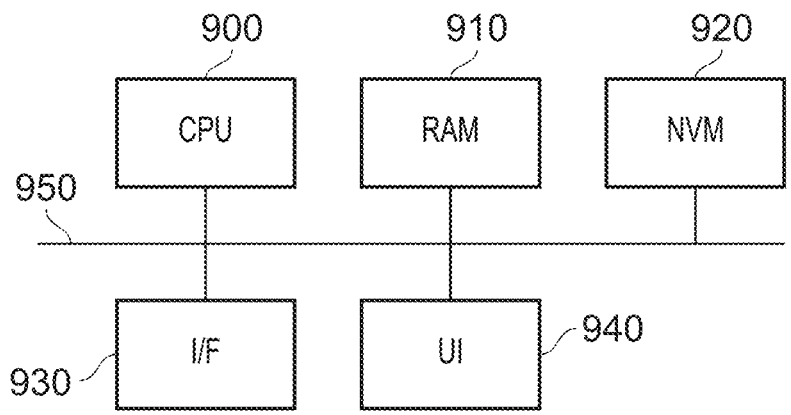
FIG. 9 schematically illustrates a data processing apparatus.

In example arrangements using images, there can be text labels (extracted from the image) associated with the generated text. These can be arranged to change the suggested words in the generated text but do not necessarily place specific restriction on particular words the way that the restrictions mentioned above do. That is, they can be arranged to change the words that will be returned to match the context of the labels but do not place specific restrictions on the types of words that are generated. This may be considered as a 'soft' restriction where the other restrictions mentioned above could be considered 'hard' restrictions as certain types of words are ruled out. Any set of words could be included in this set of labels, for example:

Style information such as the genre: Horror, 1950s, Dark
    Text passage context such as
        a battle, guns, explosions
        a party, alcohol, music Summary Data Processing Apparatus FIG. 9 schematically illustrates a data processing apparatus which can be used to implement, for example, an external server of the type discussed above to implement the text handling process, and/or the selection controller itself, the apparatus of FIG. 9 comprises a processing unit (CPU) 900, a random access memory (RAM) 910, a non-volatile memory (NVM) 920, being a non-volatile machine-readable storage medium, for example a magnetic or optical disc, a read only memory, a flash memory or the like, a network interface (C/F) 930, a user interface (UI) 940. These components are interconnected by a bus structure 950.

Summary Method

Figure 10:
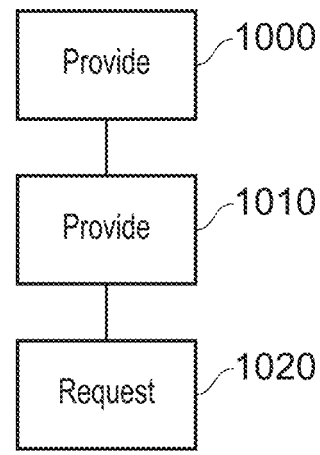
FIG. 10 is a schematic flowchart illustrating a method.

FIG. 10 is a schematic flowchart illustrating a computer-implemented method comprising:

providing (at a step 1000) a text document from a data memory to a text handling process to identify one or more characteristics of words in the text document:

providing (at a step 1010) user selection of one or more of the words in the text document to be substituted and to select one or more target characteristics (which may be or include identified characteristics or characteristics of a previous or original word to be retained, for example); and requesting (at a step 1020) from the text handling process a set of one or more substitute words for the selected words such that the substitute words comply with the selected one or more of the target characteristics.

It will be apparent that numerous modifications and variations of the present disclosure are possible in light of the above teachings. It is therefore to be understood that within the scope of the appended clauses, the technology may be practised otherwise than as specifically described herein.

Various respective aspects and features will be defined by the following numbered clauses:

1. Data processing apparatus comprising:
   a data memory;
   a selection controller comprising a computer processor; and
   a digital interface between a control process implemented by the selection controller and a text handling process implemented by the computer processor or another processor;
   in which:
   the selection controller is configured to provide a text document from the data memory to the text handling process to identify one or more characteristics of words in the text document;
   the selection controller is configured to provide user selection of one or more of the words in the text document to be substituted and of one or more target characteristics; and
   the selection controller is configured to request from the text handling process a set of one or more substitute words for the selected words such that the substitute words comply with the selected one or more target characteristics.
2. The apparatus of clause 1, in which the target characteristics comprise one or more of the identified characteristics and the selection controller is configured to provide user selection of one or more of the identified characteristics to be retained as target characteristics.
3. The apparatus of clause 1 or clause 2, in which:
   the selection controller is configured to request from the text handling process a set of one or more substitute words at respective word locations; and,
   the selection controller is configured to provide user selection of two or more target characteristics associated with a given word location.
4. The apparatus of any one of the preceding clauses, in which the text handling process is implemented by an external server, the digital interface comprising an interface with the external server.
5. The apparatus of clause 4, in which the selection controller is configured to generate a query to the external server, the query defining at least a word to be substituted.
6. The apparatus of any one of the preceding clauses, in which the selection controller is configured to generate for display a representation of the text document and any currently selected words and/or identified and/or target characteristics.
7. The apparatus of clause 6, in which the selection controller is configured to generate for display a representation of two or more target and/or identified characteristics associated with a given word.
8. The apparatus of any one of the preceding clauses, in which the selection controller is configured to generate for display a representation of the set of one or more substitute words to the user.
9. The apparatus of any one of the preceding clauses, in which the identified characteristics comprise one or more selected from the list consisting of:
   parts of speech;
   emotion tags; and
   classification of a word as a weapon, noise, vehicle, city, food, flavour, emotion or other classification.
10. The apparatus of any one of the preceding clauses, in which the target characteristics comprise one or more selected from the list consisting of:
    parts of speech;
    emotion tags; and
    classification of a word as a weapon, noise, vehicle, city, food, flavour, emotion or other classification.
11. The apparatus of any one of the preceding clauses, in which the selection controller is configured to provide user specification of a further word to be inserted into the text document and of a selectable target characteristic of the further word and to generate a query to the text handling process indicating the target characteristic and a location, with respect to the text document, of the word to be inserted.
12. The apparatus of clause 10, in which:
    the selection controller is configured to provide user specification of a target characteristic of the further word to be inserted into the text document by associating an image with the location, in the text document, of the further word to be inserted into the text document; and
    the selection controller is configured to detect a target characteristic of the further word by one or more selected from the list consisting of:
    detecting metadata associated with the image; and
    providing the image to an image classification process implemented by the computer processor or another processor.
13. A computer-implemented method comprising:
    providing a text document from a data memory to a text handling process to identify one or more characteristics of words in the text document;
    providing user selection of one or more of the words in the text document to be substituted and one or more target characteristics; and
    requesting from the text handling process a set of one or more substitute words for the selected words such that the substitute words comply with the selected one or more target characteristics.
14. Computer software which, when executed by a computer, causes the computer to perform the method of clause 13.
15. A machine readable non-transitory storage medium which stores the computer software of clause 14.

The invention claimed is:

1. A data processing apparatus, comprising:
a data memory;
processing circuitry; and
a digital interface between a control process and a text handling process implemented by the processing circuitry, wherein the digital interface is organized as a set of planes including a restriction plane, a word plane, and a feature plane, wherein the word plane is disposed between the restriction plane and the feature plane, wherein features in the feature plane and one or more target characteristics in the restriction plane that correspond with a word in the word plane are each organized as a stack in their respective planes and positioned vertically relative to the corresponding word in the word plane,
wherein the processing circuitry is configured to
provide a text document from the data memory to the text handling process to identify one or more characteristics of words in the text document,
automatically adopt one or more of the identified characteristics associated with a word location of a user-selected word as the one or more target characteristics and display the one or more target characteristics in the restriction plane of the digital interface, receive, at the digital interface, a user selection of one or more of the words in the text document to be substituted, request from the text handling process a set of one or more substitute words for the selected words such that the substitute words comply with the one or more target characteristics, receive, at the digital interface, a user selection of a further word to be inserted into the text document and of a selectable target characteristic of the further word, generate a query to the text handling process indicating the selectable target characteristic and a location, with respect to the text document, of the further word to be inserted, and wherein the user selection of the selectable target characteristic of the further word to be inserted into the text document is based on associating an image with the location, in the text document, of the further word to be inserted into the text document, wherein the image is a schematic image applied as a rule, wherein the rule is a first type of rule in response to a first type of schematic image, the first type of rule corresponding to changing words that match a context of the image but do not place specific restrictions on a part of speech of words that are generated, and a second type of rule in response to a second type of schematic image different than the first type of schematic image, the second type of rule corresponding to the context of the image being used as a restriction for an intended meaning of the further word to be inserted into the text document such that one or more parts of speech are ruled out.

2. The apparatus of claim 1, in which the target characteristics comprise one or more of the identified characteristics and the processing circuitry is configured to receive a selection of one or more of the identified characteristics to be retained as target characteristics.

3. The apparatus of claim 1, wherein the processing circuitry is further configured to request from the text handling process a set of one or more substitute words at respective word locations; and
   receive selection of two or more target characteristics associated with a given word location.

4. The apparatus of claim 1, in which the text handling process is implemented by an external server, the digital interface comprising an interface with the external server.

5. The apparatus of claim 4, wherein the processing circuitry is further configured to generate a query to the external server, the query defining at least a word to be substituted.

6. The apparatus of claim 1, wherein the processing circuitry is further configured to generate for display a representation of the text document and any currently selected words and/or identified and/or target characteristics.

7. The apparatus of claim 6, wherein the processing circuitry is further configured to generate for display a representation of two or more target and/or identified characteristics associated with a given word.

8. The apparatus of claim 1, wherein the processing circuitry is further configured to generate for display a representation of the set of one or more substitute words to the user.

9. The apparatus of claim 1, in which the identified characteristics comprise one or more selected from the list consisting of:
   parts of speech;
   emotion tags; and
   classification of a word as a weapon, noise, vehicle, city, food, flavour, emotion or other classification.

10. The apparatus of claim 1, in which the selectable target characteristics and the one or more target characteristics that are automatically adopted comprise one or more selected from the list consisting of:
    parts of speech;
    emotion tags; and
    classification of a word as a weapon, noise, vehicle, city, food, flavour, emotion or other classification.

11. The apparatus of claim 10, wherein the processing circuitry is further configured to detect a target characteristic of the further word by one or more of:
    detecting metadata associated with the image; and
    providing the image to an image classification process implemented by the computer processor or another processor.

12. A computer-implemented method, comprising:
    providing a text document from a data memory to a text handling process to identify one or more characteristics of words in the text document;
    automatically adopting one or more of the identified characteristics associated with a word location of a user-selected word as one or more target characteristics;
    displaying, by a digital interface, a set of planes including a restriction plane, a word plane, and a feature plane, wherein the word plane is disposed between the restriction plane and the feature plane, wherein features in the feature plane and the one or more target characteristics in the restriction plane that correspond with a word in the word plane are each organized as a stack in their respective planes and positioned vertically relative to the corresponding word in the word plane,
    receiving selection of one or more of the words in the text document to be substituted;
    requesting from the text handling process a set of one or more substitute words for the selected words such that the substitute words comply with the one or more target characteristics;
    receiving a user selection of a further word to be inserted into the text document and of a selectable target characteristic of the further word;
    generating a query to the text handling process indicating the selectable target characteristic and a location, with respect to the text document, of the further word to be inserted; and
    wherein the user selection of the selectable target characteristic of the further word to be inserted into the text document is based on associating an image with the location, in the text document, of the further word to be inserted into the text document, wherein the image is a schematic image applied as a rule,
    wherein the rule is a first type of rule in response to a first type of schematic image, the first type of rule corresponding to changing words that match a context of the image but do not place specific restrictions on parts of speech of words that are generated, and a second type of rule in response to a second type of schematic image different than the first type of schematic image, the second type of rule corresponding to the context of the image being used as a restriction for an intended meaning of the further word to be inserted into the text document such that one or more parts of speech are ruled out.

13. A non-transitory computer-readable storage medium storing computer-readable instructions thereon which, when executed by a computer, cause the computer to perform a method, the method comprising:

providing a text document from a data memory to a text handling process to identify one or more characteristics of words in the text document;

automatically adopting one or more of the identified characteristics associated with a word location of a user-selected word as one or more target characteristics;

displaying, by a digital interface, a set of planes including a restriction plane having the one or more target characteristics, a word plane, and a feature plane, wherein the word plane is disposed between the restriction plane and the feature plane, wherein features in the feature plane and the one or more target characteristics in the restriction plane that correspond with a word in the word plane are each organized as a stack in their respective planes and positioned vertically relative to the corresponding word in the word plane, receiving selection of one or more of the words in the text document to be substituted;

requesting from the text handling process a set of one or more substitute words for the selected words such that the substitute words comply with the one or more target characteristics;

receiving a user selection of a further word to be inserted into the text document and of a selectable target characteristic of the further word;

generating a query to the text handling process indicating the selectable target characteristic and a location, with respect to the text document, of the further word to be inserted; and wherein the user selection of the selectable target characteristic of the further word to be inserted into the text document is based on associating an image with the location, in the text document, of the further word to be inserted into the text document, wherein the image is a schematic image applied as a rule, wherein the rule is a first type of rule in response to a first type of schematic image, the first type of rule corresponding to changing words that match a context of the image but do not place specific restrictions on parts of speech of words that are generated, and a second type of rule in response to a second type of schematic image different than the first type of schematic image, the second type of rule corresponding to the context of the image being used as a restriction for an intended meaning of the further word to be inserted into the text document such that one or more parts of speech are ruled out.

* * * * *